(12) United States Patent
Xu et al.

(10) Patent No.: US 11,636,604 B2
(45) Date of Patent: Apr. 25, 2023

(54) EDGE DETECTION METHOD AND DEVICE, ELECTRONIC EQUIPMENT, AND COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glorify Software Limited, Hangzhou (CN)

( * ) Notice: Subject to any disclaimer, the term of this patent is extended or adjusted under 35 U.S.C. 154(b) by 429 days.

(21) Appl. No.: 16/981,293

(22) PCT Filed: Aug. 30, 2019

(86) PCT No.: PCT/CN2019/103850
§ 371 (c)(1),
(2) Date: Sep. 16, 2020

(87) PCT Pub. No.: WO2020/228187
PCT Pub. Date: Nov. 19, 2020

(65) Prior Publication Data
US 2022/0215557 A1     Jul. 7, 2022

(30) Foreign Application Priority Data

May 16, 2019 (CN) .......................... 201910407150.7

(51) Int. Cl.
*G06T 7/13* (2017.01)
*G06T 7/136* (2017.01)
(Continued)

(52) U.S. Cl.
CPC ................ *G06T 7/13* (2017.01); *G06T 7/136* (2017.01); *G06T 7/181* (2017.01); *G06T 2207/20084* (2013.01); *G06V 30/1607* (2022.01)

(58) Field of Classification Search
CPC ......... G06V 30/1607; G06T 7/10; G06T 7/12; G06T 7/13; G06T 7/136; G06T 7/181;
(Continued)

(56) References Cited

U.S. PATENT DOCUMENTS

2018/0089833 A1* 3/2018 Lewis ................. G06T 7/12
2018/0253852 A1   9/2018 Zhang et al.
(Continued)

FOREIGN PATENT DOCUMENTS

| CN | 107622499 | 1/2018 |
| CN | 108647634 | 10/2018 |
| CN | 109523603 | 3/2019 |

OTHER PUBLICATIONS

Montero, Andres Solis, et al. "Robust line extraction based on repeated segment directions on image contours." 2009 IEEE Symposium on Computational Intelligence for Security and Defense Applications. IEEE, 2009. (Year: 2009).*
(Continued)

*Primary Examiner* — Geoffrey E Summers
(74) *Attorney, Agent, or Firm* — JCIP Global Inc.

(57) ABSTRACT

The invention provides an edge detection method and a device of an object in an image, an electronic equipment, and a computer-readable storage medium. The method includes: a line drawing of a grayscale contour in the image is obtained; similar lines in the line drawing are merged to obtain initial merged lines, and a boundary matrix is determined according to the initial merged lines; similar lines in the initial merged lines are merged to obtain target lines, and
(Continued)

unmerged initial merged lines are also used as target lines; reference boundary lines are determined from the target lines according to the boundary matrix; boundary line regions of the object in the image are obtained; a target boundary line corresponding to the boundary line region is determined from the reference boundary lines; an edge of the object in the image is determined according to the determined target boundary lines.

20 Claims, 7 Drawing Sheets

(51) Int. Cl.
   *G06T 7/181* (2017.01)
   *G06V 30/16* (2022.01)
(58) Field of Classification Search
   CPC ........... G06T 7/168; G06T 2207/20061; G06T 2207/20081
   See application file for complete search history.

(56) References Cited

U.S. PATENT DOCUMENTS

2019/0370943 A1* 12/2019 Wang ..................... G06T 3/00
2020/0364910 A1* 11/2020 Price .................... G06V 10/454

OTHER PUBLICATIONS

"International Search Report (Form PCT/ISA/210) of PCT/CN2019/103850," dated Feb. 18, 2020, pp. 1-4.

* cited by examiner

EDGE DETECTION METHOD AND DEVICE, ELECTRONIC EQUIPMENT, AND COMPUTER-READABLE STORAGE MEDIUM

CROSS-REFERENCE TO RELATED APPLICATION

This application is a 371 of international application of PCT application serial no. PCT/CN2019/103850, filed on Aug. 30, 2019, which claims the priority benefit of China application no. 201910407150.7, filed on May 16, 2019. The entirety of each of the above mentioned patent applications is hereby incorporated by reference herein and made a part of this specification.

BACKGROUND OF THE INVENTION

Field of the Invention

The invention relates to the technical field of image processing, and in particular, to an edge detection method and a device of an object in an image, an electronic equipment, and a computer-readable storage medium.

Description of Related Art

At present, people often take pictures of objects, such as business cards, test sheets, test forms, documents, and other objects, and hope to perform corresponding processing on an image obtained by taking pictures to obtain information about the objects in the image. However, the image obtained by taking pictures not only contains objects, but also inevitably contains the external environment in which the objects are located. The external environment area is superfluous for identifying the information of objects in the image. Therefore, when processing the image to obtain the information of the objects in the image, it is necessary to detect the edge of the objects from the image in order to extract the objects from the image according to the edge of the objects. How to detect the edge of the objects in the image is an urgent issue to be solved.

SUMMARY OF THE INVENTION

The invention herein involves an edge detection method and a device of an object in an image, an electronic equipment, and a computer-readable storage medium to detect an edge of the object in the image. The specific technical solution is:

In a first aspect, the invention provides an edge detection method of an object in an image, the method including the following steps.

An image is processed to obtain a line drawing of a grayscale contour in the image;
  a plurality of similar lines in the line drawing are merged to obtain a plurality of initial merged lines, and a boundary matrix is determined according to the plurality of initial merged lines;
  a plurality of target lines are obtained according to the plurality of initial merged lines, including: a plurality of similar initial merged lines in the plurality of initial merged lines are merged to obtain at least one of the target lines, and one or a plurality of unmerged initial merged lines are used as one or a plurality of the targets lines;
  a plurality of reference boundary lines are determined from the plurality of target lines according to the boundary matrix;
  the image is processed via a pre-trained boundary line region identification model to obtain a plurality of boundary line regions of the object in the image, wherein the boundary line region identification model is a model based on a neural network;
  for each of the boundary line regions, a target boundary line corresponding to the boundary line region is determined from the plurality of reference boundary lines;
  an edge of the object in the image is determined according to the plurality of target boundary lines determined by the plurality of boundary line regions.

Optionally, in the edge detection method of the object in the image, the processing of the image to obtain the line drawing of the grayscale contour in the image includes:
  the image is processed by an edge detection algorithm based on OpenCV to obtain the line drawing of the grayscale contour in the image.

Optionally, in the edge detection method of the object in the image, merging the plurality of similar lines in the line drawing to obtain the plurality of initial merged lines includes:
  a plurality of long lines in the line drawing are obtained, wherein the long lines are lines having a length exceeding a first preset threshold;
  a plurality of groups of first-type lines are obtained from the plurality of long lines, wherein each group of the first-type lines includes at least two long lines adjacent in sequence, and an angle between any two adjacent long lines is less than a second preset threshold;
  for each group of first-type lines, each of the long lines in the group of first-type lines is merged in sequence to obtain one of the initial merged lines.

Optionally, in the edge detection method of the object in the image, merging similar initial merged lines in the plurality of initial merged lines to obtain the target lines includes:
  a plurality of groups of second-type lines are obtained from the plurality of initial merged lines, wherein each group of the second-type lines includes at least two of the initial merged lines adjacent in sequence, and an angle between any two adjacent initial merged lines is less than a third preset threshold;
  for each group of second-type lines, each of the initial merged lines in the group of second-type lines is merged in sequence to obtain a target line.

Optionally, in the edge detection method of the object in the image, an angle θ of two lines is calculated by the following formula:

$$\vec{a} \cdot \vec{b} = |\vec{a}||\vec{b}| \cos\theta,$$

wherein $\vec{a}$ and $\vec{b}$ respectively represent a vector of two lines.

Optionally, in the edge detection method of the object in the image, the boundary matrix is determined in the following manner: the plurality of initial merged lines and unmerged long lines in the long lines are redrawn, a position information of pixels in all the redrawn lines is mapped to an entire image matrix, and a value of a position of the pixels of the lines in the image matrix is set to a first value and a value of a position of the pixels other than the lines is set to a second value, thereby forming a boundary matrix.

Optionally, in the edge detection method of the object in the image, determining the plurality of reference boundary lines from the plurality of target lines according to the boundary matrix includes:

for each of the target lines, the target line is extended, a line matrix is determined according to the extended target line, then the line matrix is compared with the boundary matrix, and a number of pixels on the extended target line belonging to the boundary matrix is calculated as a score of the target line, wherein the line matrix is a same size as the boundary matrix;

a plurality of reference boundary lines are determined from the plurality of target lines according to the score of each of the target lines.

Optionally, in the edge detection method of the object in the image, for each of the boundary line regions, determining the target boundary line corresponding to the boundary line region from the plurality of reference boundary lines includes:

a slope of each of the reference boundary lines is calculated;

the boundary line regions are converted into a plurality of straight lines for each of the boundary line regions and an average slope of the plurality of straight lines is calculated, and then whether there is a reference boundary line having a slope matching the average slope in the plurality of reference boundary lines is determined, and if yes, then the reference boundary line is determined as the target boundary line corresponding to the boundary line region.

Optionally, in the edge detection method of the object in the image, the method further includes:

for each of the boundary line regions, if it is determined that there is no reference boundary line having a slope matching the average slope in the plurality of reference boundary lines, then for each of the straight lines converted from the boundary line region, the line matrix formed by the straight line is compared with the boundary matrix, a number of pixels on the straight lines belonging to the boundary matrix is calculated as a score of the straight lines, and a straight line with a best score is determined as the target boundary line corresponding to the boundary line region, wherein the line matrix and the boundary matrix have a same size.

Optionally, in the edge detection method of the object in the image, converting the boundary line region into the plurality of straight lines includes:

the boundary line region is converted into the plurality of straight lines by Hough transform.

Optionally, in the edge detection method of the object in the image, the line matrix is determined in the following manner: the extended target line or the lines are redrawn, a position information of pixels in all the redrawn lines are mapped to an entire image matrix, and a value of a position of the pixels of the lines in the image matrix is set to a first value and a value of a position of the pixels other than the lines is set to a second value, thereby forming a line matrix.

Optionally, in the edge detection method of the object in the image, the boundary line region identification model is trained in the following manner:

each image sample in an image sample set is subjected to a label processing to label a boundary region, an internal region, and an external region of an object in each image sample;

a neural network is trained via the image sample set subjected to the label processing to obtain a boundary line region identification model.

Optionally, in the edge detection method of the object in the image, the method further includes:

a plurality of intersection points of the plurality of target boundary lines are obtained, and a projective transformation is performed on regions determined by the plurality of intersection points and the plurality of target boundary lines to obtain a front view of the object in the image.

In a second aspect, the invention provides an edge detection device of an object in an image, the device including:

an obtaining module configured to process an image to obtain a line drawing of a grayscale contour in the image;

a first merge module configured to merge a plurality of similar lines in the line drawing to obtain a plurality of initial merged lines, and a boundary matrix is determined according to the plurality of initial merged lines;

a second merge module configured to obtain a plurality of target lines according to the plurality of initial merged lines, including: a plurality of similar initial merged lines in the plurality of initial merged lines are merged to obtain at least one of the target lines, and one or a plurality of unmerged initial merged lines are also used as one or a plurality of the targets lines;

a first determination module configured to determine a plurality of reference boundary lines from the plurality of target lines according to the boundary matrix;

an identification module configured to process the image via a pre-trained boundary line region identification model to obtain a plurality of boundary line regions of the object in the image, wherein the boundary line region identification model is a model based on a neural network;

a second determination module configured to determine, for each of the boundary line regions, a target boundary line corresponding to the boundary line region from the plurality of reference boundary lines;

a third determination module configured to determine an edge of the object in the image according to the plurality of target boundary lines determined by the plurality of boundary line regions.

Optionally, in the edge detection device of the object in the image, the obtaining module is specifically configured to: process an image via an edge detection algorithm based on OpenCV to obtain a line drawing of a grayscale contour in the image.

Optionally, in the edge detection device of the object in the image, the first merge module merging the plurality of similar lines in the line drawing to obtain the plurality of initial merged lines includes:

a plurality of long lines in the line drawing are obtained, wherein the long lines are lines having a length exceeding a first preset threshold;

a plurality of groups of first-type lines are obtained from the plurality of long lines, wherein each group of first-type lines includes at least two long lines adjacent in sequence, and an angle between any two adjacent long lines is less than a preset threshold;

for each group of first-type lines, each of the long lines in the group of first-type lines is merged in sequence to obtain one of the initial merged lines.

Optionally, in the edge detection device of the object in the image, the second merge module merging similar initial merged lines in the plurality of initial merged lines to obtain the target lines is specifically: a plurality of groups of second-type lines are obtained from the plurality of initial merged lines, wherein each group of second-type lines includes at least two merged initial merged lines adjacent in sequence, and an angle between any two adjacent initial merged lines is less than a third preset threshold. For each group of second-type lines, each of the initial merged lines in the group of second-type lines is merged in sequence to obtain the target lines.

Optionally, in the edge detection device of the object in the image, an angle θ of two lines is calculated by the following formula: $\vec{a} \cdot \vec{b} = |\vec{a}||\vec{b}| \cos θ$, wherein $\vec{a}$ and $\vec{b}$ respectively represent a vector of two lines.

Optionally, in the edge detection device of the object in the image, the boundary matrix is determined in the following manner: the plurality of initial merged lines and unmerged long lines in the long lines are redrawn, a position information of pixels in all the redrawn lines are mapped to an entire image matrix, and a value of a position of the pixels of the lines in the image matrix is set to a first value and a value of a position of the pixels other than the lines is set to a second value, thereby forming a boundary matrix.

Optionally, in the edge detection device of the object in the image, the first determination module includes:
 a first calculation sub-module configured to, for each of the target lines, extend the target line, determine a line matrix according to the extended target line, then compare the line matrix with the boundary matrix, and calculate a number of pixels on the extended target line belonging to the boundary matrix as a score of the target line, wherein the line matrix is a same size as the boundary matrix;
 a first determination sub-module configured to determine a plurality of reference boundary lines from the plurality of target lines according to the score of each of the target lines.

Optionally, in the edge detection device of the object in the image, the second determination module includes:
 a second calculation sub-module configured to calculate a slope of each of the reference boundary lines;
 a second determination sub-module configured to convert the boundary line regions into a plurality of straight lines for each of the boundary line regions and calculate an average slope of the plurality of straight lines, and then determine whether there is a reference boundary line having a slope matching the average slope in the plurality of reference boundary lines, and if yes, then the reference boundary line is determined as the target boundary line corresponding to the boundary line region.

Optionally, in the edge detection device of the object in the image, the second determination sub-module is further configured to:
 for each of the boundary line regions, if it is determined that there is no reference boundary line having a slope matching the average slope in the plurality of reference boundary lines, then for each of the straight lines converted from the boundary line region, the line matrix formed by the straight line is compared with the boundary matrix. A number of pixels on the straight line belonging to the boundary matrix is calculated as a score of the straight line. The straight line with a best score is determined as the target boundary line corresponding to the boundary line region, wherein the line matrix and the boundary matrix have a same size.

Optionally, in the edge detection device of the object in the image, the second determination sub-module converting the boundary line region into the plurality of straight lines is specifically: the boundary line region is converted into the plurality of straight lines using Hough transform.

Optionally, in the edge detection device of the object in the image, the line matrix is determined in the following manner: the extended target line or the straight lines are redrawn, a position information of pixels in all the redrawn lines are mapped to an entire image matrix, and a value of a position of the pixels of the lines in the image matrix is set to a first value and a value of a position of the pixels other than the lines is set to a second value, thereby forming a line matrix.

Optionally, in the edge detection device of the object in the image, the device further includes: a model training module configured to train in the following manner to obtain a boundary line region identification model;
 each image sample in an image sample set is subjected to a label processing to label a boundary line region, an inner region, and an outer region of an object in each of the image samples; and a neural network is trained via the image sample set subjected to the label processing to obtain the boundary line region identification model.

Optionally, in the edge detection device of the object in the image, the device further includes: a transformation module configured to obtain a plurality of intersection points of the plurality of target boundary lines and perform a projective transformation on regions determined by the plurality of intersection points and the plurality of target boundary lines to obtain a front view of the object in the image.

In a third aspect, the invention also provides an electronic equipment, including a processor, a communication interface, a memory, and a communication bus, wherein the processor, the communication interface, and the memory complete a communication between each other via the communication bus;
 the memory is configured to store a computer program;
 the processor is configured to implement the steps of the edge detection method of the object in the image in the first aspect when executing a program stored in the memory.

In a fourth aspect, the invention also provides a computer-readable storage medium. A computer program is stored in the computer-readable storage medium. When the computer program is executed by the processor, the steps of the edge detection method of the object in the image described in the first aspect above are implemented.

Compared with the prior art, the edge detection method and the device of the object in the image, the electronic equipment, and the computer-readable storage medium provided by the invention have the following beneficial effects:
 first, the line drawing of the grayscale contour in the image is obtained, and similar lines in the line drawing are merged to obtain a plurality of initial merged lines. A boundary matrix is determined according to the plurality of initial merged lines, and the similar lines in the plurality of initial merged lines are further merged to obtain target lines. At the same time, the initial merged lines that may not be merged are also directly used as target lines, and then a plurality of reference boundary lines are determined from the plurality of target lines according to the boundary matrix. At the same time, the image is processed via a pre-trained boundary line region identification model to obtain a plurality of boundary line regions of the object in the image. Therefore, for each boundary line region, a target boundary line corresponding to the boundary line region may be determined from the plurality of reference boundary lines, and then an edge of the object in the image may be determined according to the plurality of determined target boundary lines. The invention obtains the reference boundary lines according to the image, and combines machine learning to identify the boundary line regions, so as to jointly determine the target boundary lines of the object in the image to achieve edge detection of the object in the image, and the position of the edge of the object in the image may be quickly located and the accuracy of edge detection is increased.

BRIEF DESCRIPTION OF THE DRAWINGS

In order to more clearly explain the embodiments of the invention or the technical solutions in the prior art, the following briefly introduces the figures needed in the description of the embodiments or the prior art. Obviously, the figures in the following description are only some embodiments of the invention. For those of ordinary skill in the art, without inventive-step effort, other figures may be obtained based on these figures.

DESCRIPTION OF THE EMBODIMENTS

The edge detection method and device of an object in an image, the electronic equipment, and the computer-readable storage medium provided by the invention are described in further detail with reference to the accompanying figures and specific embodiments. The advantages and features of the invention will be clearer from the claims and the following description. It should be noted that the figures are all in a very simplified form and all adopt inaccurate proportions, which are only used to conveniently and clearly assist in the object of explaining the embodiments of the invention. In addition, it should be noted that each block in the block diagrams and/or flowcharts herein, and combinations of blocks in the block diagrams and/or flowcharts, may be implemented with a dedicated hardware-based system executing prescribed functions or actions, or may be implemented with a combination of dedicated hardware and computer program instructions. It is well known to those skilled in the art that implementation by hardware, implementation by software, and implementation by combining software and hardware are all equivalent.

In order to make the objects, features, and advantages of the invention more obvious and understandable, please refer to FIGS. 1 to 6. It should be noted that the structure, ratio, size, etc. shown in the figures of the present specification are all only used to match the contents disclosed in the specification for those familiar with this technique to understand and read, and are not to limit the limiting conditions implemented by the invention, and therefore have no technical significance. Any modification of structure, change of proportional relationship, or adjustment of size should still fall within the scope of the technical content disclosed by the invention without affecting the efficacy and achievable objects of the invention.

To solve the issues in the prior art, embodiments of the invention provide an edge detection method and a device of an object in an image, an electronic device, and a computer-readable storage medium.

It should be noted that the edge detection method of the object in the image of an embodiment of the invention may be applied to the edge detection device of the object in the image of an embodiment of the invention, and the edge detection device of the object in the image may be disposed on an electronic equipment. In particular, the electronic equipment may be a personal computer, a mobile terminal, etc. The mobile terminal may be a hardware equipment with various operating systems, such as a mobile phone or a tablet computer.

Figure 1:
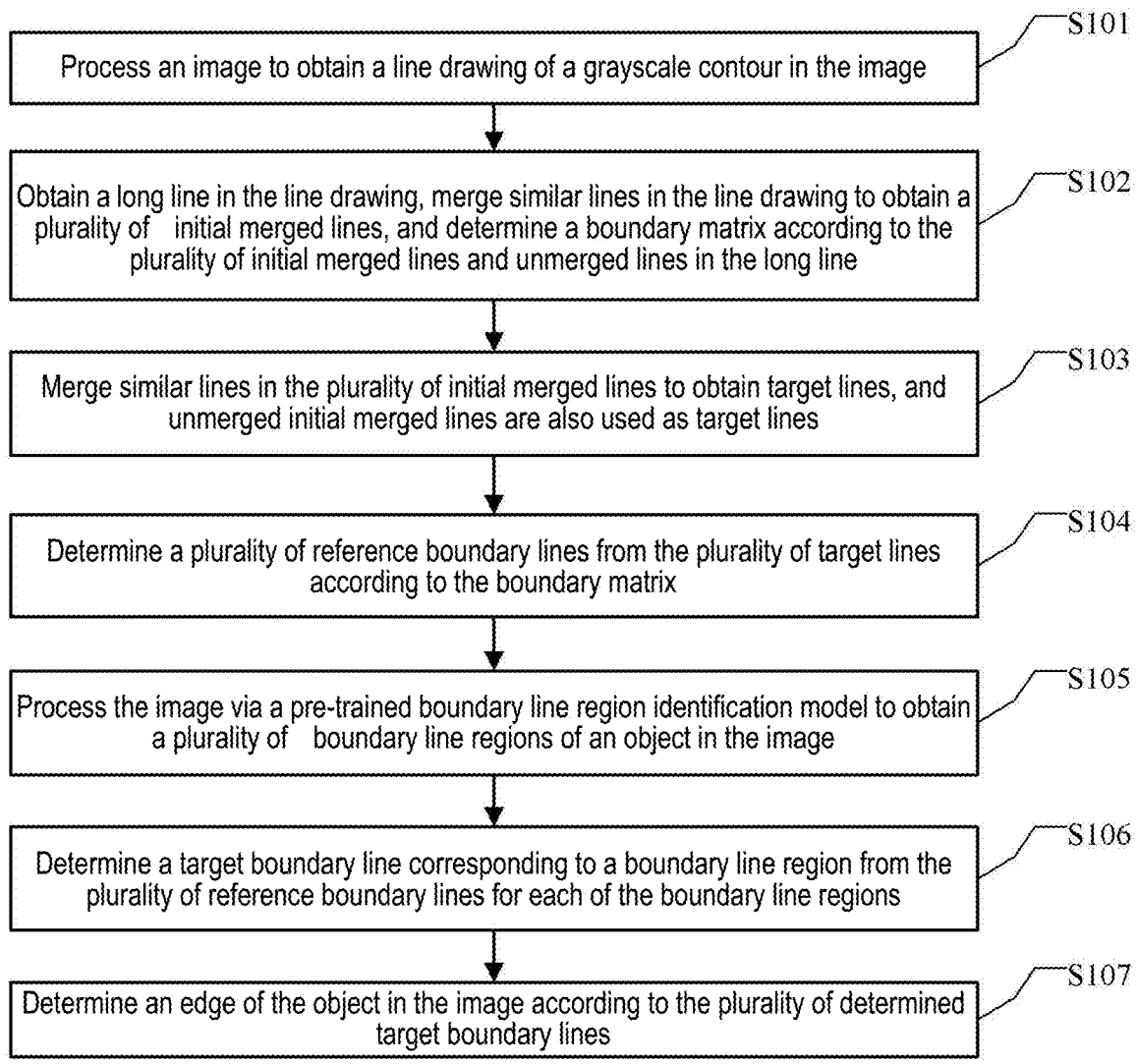
FIG. 1 is a flowchart of an edge detection method of an object in an image provided by an embodiment of the invention.

FIG. 1 is a flowchart of an edge detection method of an object in an image provided by an embodiment of the invention. Please refer to FIG. 1, an edge detection method of an object in an image may include the following steps:

Step S101, an image is processed to obtain a line drawing of a grayscale contour in the image.

Figure 2A:
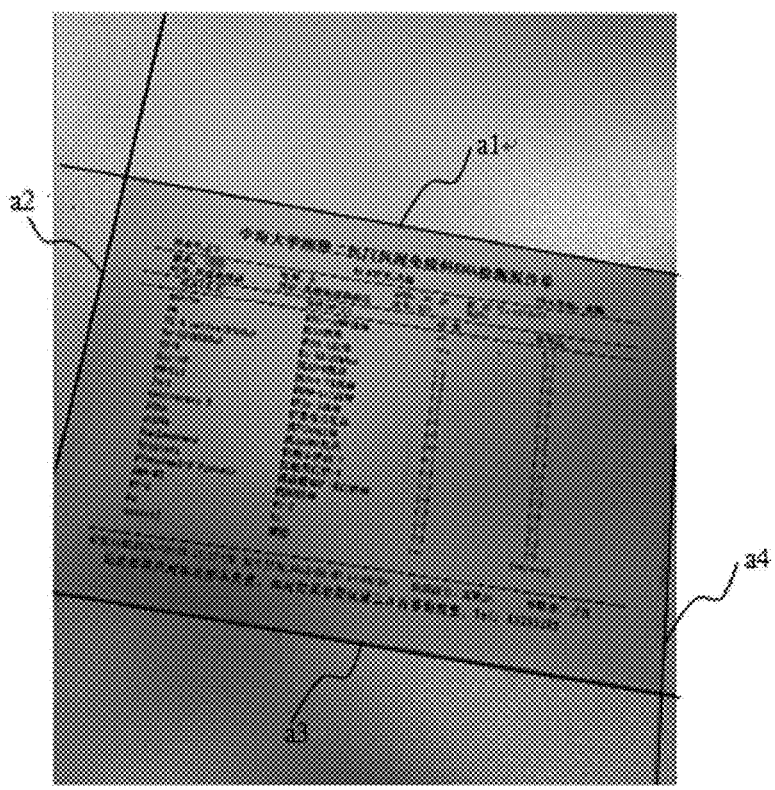
FIG. 2A to FIG. 2C are exemplary diagrams of an image in a specific embodiment of the invention.
Figure 3A:
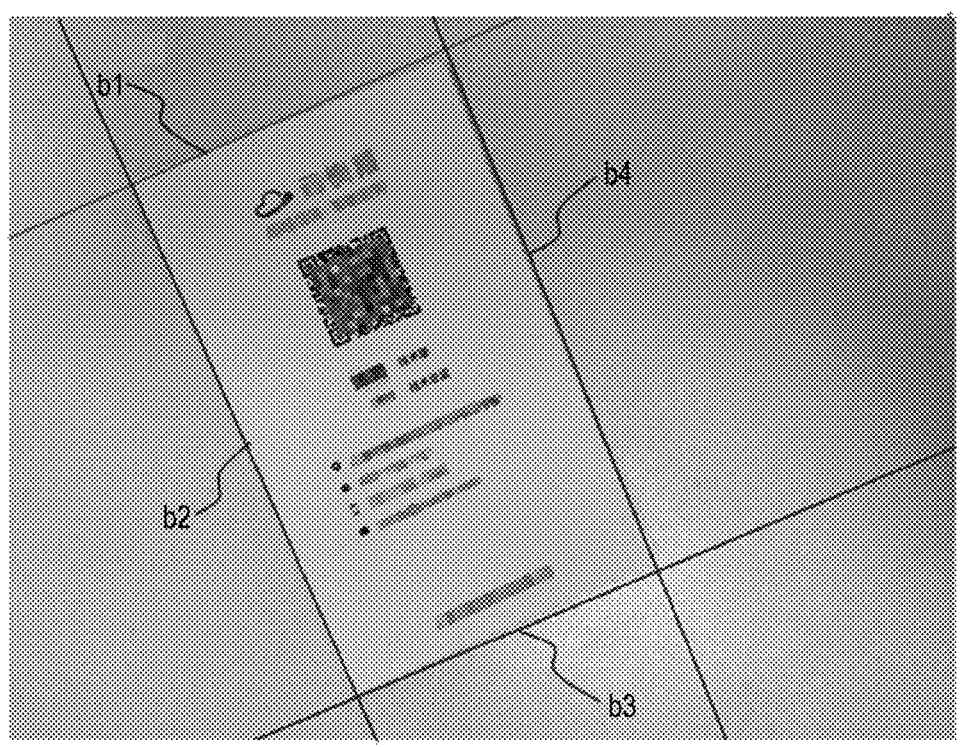
FIG. 3A to FIG. 3C are exemplary diagrams of an image in another specific embodiment of the invention.

In particular, the image is an image obtained by a user taking a picture of an object, and the object may be, for example, a business card, a test sheet, a test form, or a document. The images shown in FIG. 2A and FIG. 3A are images obtained by photographing a test form and a business card, respectively.

Specifically, a method of processing the image to obtain the line drawing of the grayscale contour in the image may be: the image is processed by an edge detection algorithm based on OpenCV to obtain the line drawing of the grayscale contour in the image. OpenCV is an open source computer vision library. Edge detection algorithms based on OpenCV include Sobel, Scarry, Canny, Laplacian, Prewitt, Marr-Hildresh, scharr, and other algorithms. In particular, the Canny edge detection algorithm is used in the present embodiment. The Canny edge detection algorithm is a multi-stage algorithm composed of a plurality of steps, including: 1. image noise reduction: the image is smoothed using a Gaussian filter; 2. image gradient calculation: gradient amplitude and direction are calculated using first-order partial derivative finite difference; 3. non-maximum suppression: non-maximum suppression of gradient amplitude is performed; 4. threshold screening: edges are detected and connected using double threshold algorithm.

Figure 2B:
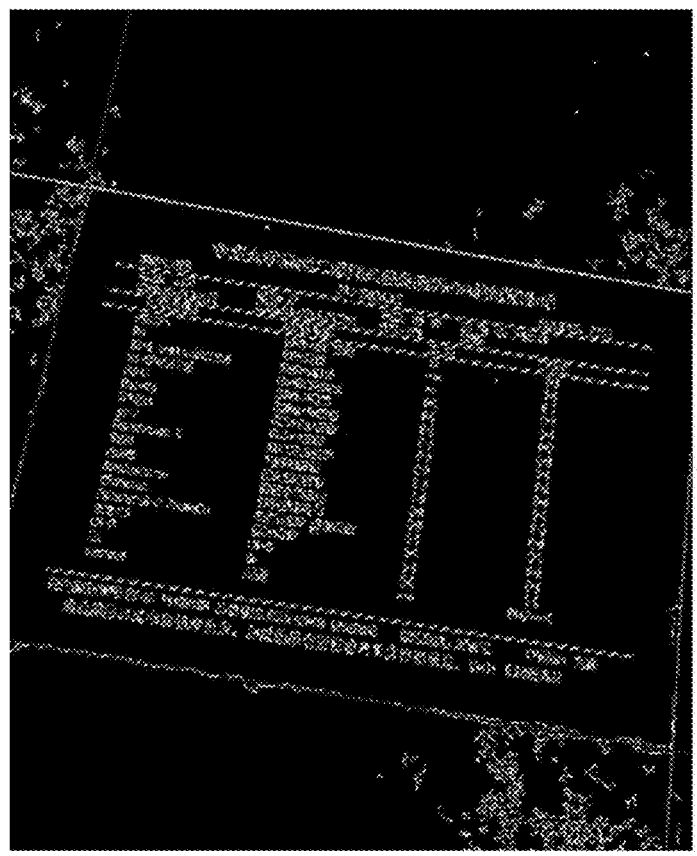
Figure 3B:
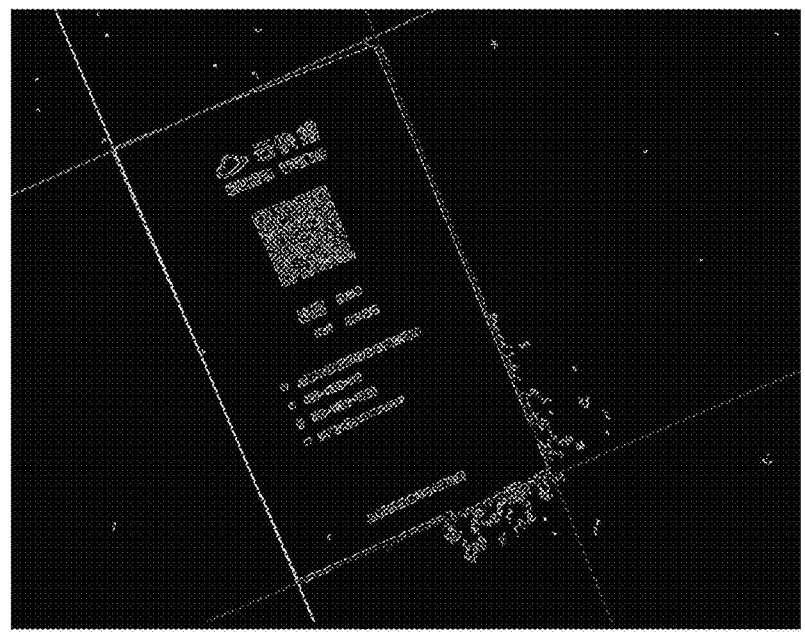

After being processed by the above algorithm, a line drawing of grayscale contour in the image may be obtained. For example, after the images shown in FIG. 2A and FIG. 3A are processed by the above algorithm, the line drawings shown in FIG. 2B and FIG. 3B are obtained, respectively. In the line drawing, each line is actually a small line segment, wherein the boundary line of the object in the image is actually also divided into small line segments, and therefore similar lines need to be connected and subsequent processing needs to be performed to obtain the boundary line of the object. In practical applications, the representation of each small line segment in the line drawing is in the form of an array, and each line segment is composed of the coordinate values of the pixels corresponding to the starting point and the end point in the entire line drawing.

Step S102, similar lines in the line drawing are merged to obtain a plurality of initial merged lines, and a boundary matrix is determined according to the plurality of initial merged lines.

Specifically, similar lines in the line drawing are merged in the following manner to obtain a plurality of initial merged lines: step A: long lines in the line drawing are obtained, wherein the long lines are lines having a length exceeding a first preset threshold; step B: a plurality of groups of first-type lines are obtained from the long lines, wherein the first-type lines include at least two long lines adjacent in sequence, and the angle between any two arbitrarily adjacent long lines is less than a second preset threshold; step C: for each group of first-type lines, each of the long lines in the group of first-type lines is merged in sequence to obtain an initial merged line.

In step A, the long lines in the line drawing refer to lines having a length exceeding a certain threshold in the line drawing, for example, lines having a length exceeding 2 pixels are defined as long lines. Only long lines in the line drawing are obtained for subsequent merge processing, and some shorter lines in the line drawing are not considered, so that line interference inside and outside the object may be avoided when lines are merged, such as corresponding lines of internal texts and graphics and other external objects, etc.

For step B, the first-type lines may be obtained by: first a long line is selected, and then whether the angle between two adjacent lines is less than the second preset threshold is determined in sequence starting from the long line. If it is determined that the angle between a certain long line and the adjacent line is not less than the second preset threshold, then the selected long line and all the long lines adjacent in sequence to the certain long line are formed into a group of first-type lines. Then, the above process is repeated. Whether the angle between two adjacent lines is less than the second preset threshold is determined in sequence starting from the adjacent lines of the certain long line, and so on, until all long lines are traversed, so as to obtain a plurality of groups of first-type lines.

Figure 4:
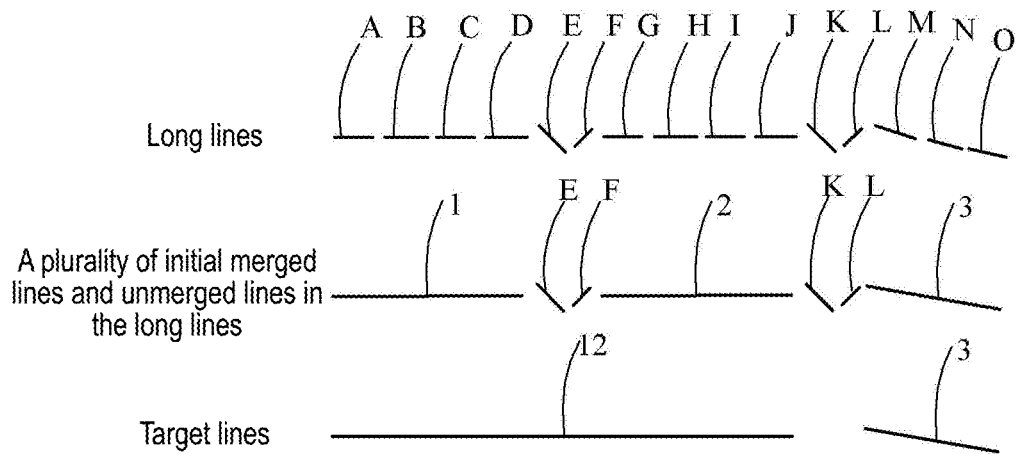
FIG. 4 is a comparison diagram of a line merging process.

Taking FIG. 4 as an example, the above process is described below. In an embodiment, for example, a first long line A is first selected. Whether the angle between the long line A and an adjacent long line B is less than the second preset threshold is determined. If the angle between the two is less than the second preset threshold, the long lines A and B belong to the same group of first-type lines. The angle between the long line B and an adjacent long line C is further determined. If the angle between the two is also less than the second preset threshold, then the long lines C and B and A also belong to the same group of first-type lines. The angle between the long line C and an adjacent long line D is further determined. If the angle between the two is also less than the second preset threshold, then the long lines D and C, B, and A also belong to the same group of first-type lines. The angle between the long line D and an adjacent long line E is further determined. If the angle between the two is greater than the second preset threshold, the long lines E and D, C, B, and A do not belong to the same group of first-type lines, and therefore the long lines A, B, C, and D may be regarded as a group of first-type lines. Then, starting from the long line E, whether the angle between two adjacent lines is less than the second preset threshold is determined in sequence. In the same way, it may be obtained that long lines G, H, I, and J are a group of first-type lines, and long lines M, N, and O are also a group of first-type lines.

In another embodiment, a long line may also be first selected arbitrarily, such as the long line D is selected, the lines adjacent to the long line D are C and E, and then the angles between the long lines D and C and the long lines D and E are respectively determined. Since the angle between the long lines D and C is less than the second preset threshold, D and C belong to the same group of first-type lines. Since the angle between the long lines D and E is greater than the second preset threshold, D and E do not belong to the same group of first-type lines. Moreover, the angle between other lines adjacent in sequence may be further determined starting from the long line C, so as to determine other lines belonging to the same group of first-type lines as D, and other groups of first-type lines. Moreover, starting from the long line E, the angle between other lines adjacent in sequence may be determined to determine other groups of first-type lines. By analogy, it may also be lastly determined that the long lines A, B, C, and D are a group of first-type lines, the long lines G, H, I, and J are a group of first-type lines, and the long lines M, N, and O are also a group of first-type lines.

In step B, an angle $\theta$ of two lines is calculated by the following formula: $\vec{a} \cdot \vec{b} = |\vec{a}||\vec{b}| \cos \theta$, wherein $\vec{a}$ and $\vec{b}$ respectively represent vectors of two adjacent lines. In particular, the value of the second preset threshold may be set according to actual conditions, such as merging when the angle $\theta$ is less than 15 degrees, that is, the second preset threshold is 15°.

In step C, merging two lines means that the slopes of the two lines are averaged, and the average value is the slope of the merged lines. In practical applications, the merging of the two lines is calculated according to the array form of the two lines, so as to calculate the coordinate values of the pixels corresponding to the starting point and the end point of the merged line in the entire line drawing, and then an array of merged lines is formed and stored according to the calculated coordinate values. Each of the long lines in each group of first-type lines is merged in sequence. For example, the first group of first-type lines A, B, C, and D in FIG. 4 are merged in sequence. The long lines A and B may be merged first, and the new line obtained after the merge is merged with the long line C. The new line obtained after merging with the long line C is then merged with the long line D, thereby obtaining an initial merged line 1. Similarly, the first-type lines of a second group are merged to obtain an initial merged line 2, and the first-type lines of a third group are merged to obtain an initial merged line 3. After the merge above, E, F, K, and L in the long lines are still not merged.

Moreover, the boundary matrix is determined in the following manner: the plurality of initial merged lines and unmerged lines in the long lines are redrawn, the position information of the pixels in all the redrawn lines is mapped to the entire image matrix, that is, an image shown in the form of a matrix, and the value of the position of the pixels of the lines in the image matrix is set to the first value and the value of the position of the pixels other than the lines is set to the second value, thereby forming the boundary matrix. Specifically, the boundary matrix may be a matrix having the same size as the image matrix. For example, the size of the image is 1024×1024 pixels, then the image matrix is a 1024×1024 matrix, so the boundary matrix is a 1024×1024 matrix. The plurality of initial merged lines and unmerged lines in the long lines are redrawn according to a certain line width (such as a line width of 2). The boundary matrix is filled with values according to the pixels of the redrawn lines corresponding to the position in the matrix. The pixels on the lines corresponding to the position in the matrix are all set to a first value such as 255, and pixels without lines corresponding to the position in the matrix are set to a second value such as 0, thereby forming a super-matrix of the entire image, that is, the boundary matrix. It should be noted that, since the plurality of initial merged lines and unmerged lines in the long lines are all stored in the form of an array, the boundary matrix needs to be formed into actual line data when the boundary matrix is determined. Therefore, the lines are redrawn, such as redrawn according to a line width of 2 to obtain the coordinate value of the pixel corresponding to each point on each line. Furthermore, the boundary matrix is filled with values according to the obtained coordinate values. For example, the value of the position corresponding to the coordinate value in the boundary matrix is set to 255, and the value of the remaining positions is set to 0.

A boundary matrix is exemplarily provided below, and the boundary matrix is a 10×10 matrix, wherein all positions in the boundary matrix with a value of 255 are connected to be a plurality of initial merged lines and unmerged lines in the long lines.

$$\begin{bmatrix} 0 & 0 & 0 & 0 & 0 & 0 & 0 & 0 & 0 & 0 \\ 0 & 255 & 255 & 255 & 255 & 255 & 255 & 255 & 255 & 0 \\ 0 & 255 & 0 & 0 & 0 & 0 & 0 & 255 & 255 & 0 \\ 0 & 0 & 255 & 0 & 0 & 0 & 255 & 0 & 255 & 0 \\ 0 & 255 & 0 & 0 & 0 & 255 & 0 & 0 & 255 & 0 \\ 0 & 255 & 0 & 0 & 255 & 0 & 0 & 0 & 255 & 0 \\ 0 & 255 & 0 & 255 & 255 & 255 & 255 & 255 & 255 & 0 \\ 0 & 255 & 255 & 0 & 0 & 0 & 0 & 0 & 255 & 0 \\ 0 & 255 & 255 & 255 & 255 & 255 & 255 & 255 & 255 & 0 \\ 0 & 0 & 0 & 0 & 0 & 0 & 0 & 0 & 0 & 0 \end{bmatrix}$$

Step S103, similar lines in the plurality of initial merged lines are merged to obtain target lines, and unmerged initial merged lines are also used as target lines.

In step S102, the merged initial merged lines are a plurality of longer lines. In step S103, whether there are similar lines in the plurality of initial merged lines may be further determined according to the merge rule in step S102 above to merge the similar lines again to obtain a plurality of target lines, and at the same time initial merged lines that may not be merged are also used as target lines.

In particular, the specific merging step of merging similar lines in the plurality of initial merged lines to obtain a target line is as follows: step a: a plurality of groups of second-type lines are obtained from the plurality of initial merged lines, wherein the second-type lines include at least two merged initial merged lines adjacent in sequence, and the angle between any two adjacent initial merged lines is less than a third preset threshold; step b: for each group of second-type lines, each of the initial merged lines in the group of second-type lines is merged in sequence to obtain a target line.

The principle of the step of merging the initial merged lines is the same as the principle of merging the lines in the line drawing in step S102, and reference may be made to the relevant description in step S102, which is not repeated herein. In particular, the third preset threshold may be the same as or different from the second preset threshold, which is not limited in the present embodiment. For example, the third preset threshold is set to an angle of 10 degrees. As shown in the comparison chart before and after line merging shown in FIG. 4, after the above steps of merging the initial merged lines 1, 2, and 3, since the angle between the initial merged lines 1 and 2 is less than the third preset threshold, the angle between the initial merged lines 3 and 2 is greater than the third preset threshold. Therefore, the initial merged lines 1 and 2 may be further merged into a target line 12, and the initial merged line 3 may not be merged, so the initial merged line 3 is directly used as a target line.

At this point, a plurality of target lines are obtained. In the plurality of target lines, there are not only reference boundary lines, but also some longer interference lines, such as longer lines obtained by merging the corresponding lines of internal texts and graphics, other external objects, etc. These interference lines are removed according to subsequent processing (specifically via the processing of step S104 to step S105) and rules.

Step S104, a plurality of reference boundary lines are determined from the plurality of target lines according to the boundary matrix.

Specifically, determining a plurality of reference boundary lines from the plurality of target lines according to the boundary matrix includes: first, for each of the target lines, the target line is extended, a line matrix is determined according to the extended target line, and then the line matrix is compared with the boundary matrix to calculate the number of pixels on the extended target line belonging to the boundary matrix as the score of the target line, wherein the line matrix and boundary matrix are the same size; then, according to the score of each of the target lines, a plurality of reference boundary lines are determined from the plurality of target lines.

In particular, the line matrix may be determined in the following manner: the extended target lines are redrawn, the position information of the pixels in all the redrawn lines are mapped to the entire image matrix, and the value of the position of the pixels of the lines in the image matrix is set to the first value and the value of the position of the pixels other than the lines is set to the second value, thereby forming a line matrix. The forming method of the line matrix is similar to that of the boundary matrix, and is not repeated herein. It should be noted that the target lines are stored in the form of an array, that is, coordinate values storing the starting point and end point thereof, and the target lines are extended. When the extended target lines are stored, an array is formed with the coordinate values of the starting point and the end point of the extended target lines. Therefore, when the extended target lines are redrawn, they are also redrawn according to the same line width, such as a line width of 2, so as to obtain the coordinate values of the pixel corresponding to each point on the extended target lines. Further, the line matrix is filled with values according to the coordinate values, that is, the value of the position corresponding to the coordinate values in the line matrix is set to 255, and the value of the remaining positions is set to 0.

The merged target lines are extended, and the target line for which the pixels thereon fall into the initial merged lines and the unmerged lines in the long lines in step S102 the most is used as a reference boundary line. For each of the target lines, determining how many pixels belong to the boundary matrix and calculating a score is specifically: the target line is extended, the line obtained after the target line is extended also forms a line matrix according to the forming method of the boundary matrix, and the line matrix is compared with the boundary matrix to determine how many pixels fall into the boundary matrix, that is, how many pixels in the same position in the two matrices have the same first value, such as 255, is determined to calculate the score. At this time, there may still be more lines with the best score. Therefore, according to the score of each of the target lines, a plurality of target lines with the best score are determined from the plurality of target lines as the reference boundary lines.

For example, a line matrix formed by an extended target line is as follows. By comparing the line matrix with the above boundary matrix, it may be seen that 7 pixels on the extended target line fall into the boundary matrix, thereby obtaining the score of the target line.

$$\begin{bmatrix} 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \end{bmatrix}$$

Step S105: the image is processed via a pre-trained boundary line region identification model to obtain a plurality of boundary line regions of the object in the image. In particular, the boundary line region identification model is a model based on a neural network.

First, the boundary line region identification model is established via machine learning training. This model may be a neural network-based model. The boundary line region identification model may be obtained by training as follows: each image sample in an image sample set is subjected to label processing to label a boundary line region, an inner region, and an outer region of the object in each image sample; and via the image sample set subjected to label processing, the neural network is trained to obtain the boundary line region identification model.

The boundary line region identification model established by machine learning training identifies the image (that is, the original image), and may identify the 3 parts of: the boundary line region, the internal region (that is, the region where the object is located), and the external region (that is, the external region of the object) in the image, so as to obtain a plurality of (such as 4) edge contour maps of the original image in all directions (that is, the boundary line region of the object in the image). At this time the edge contour is thicker.

It may be understood that the model established by machine learning training identifies the boundary line region of the object in the image, and determines the target boundary line from the plurality of reference boundary lines determined in step S104 via the boundary line region in the subsequent step S106 to remove the lines that are misidentified in steps S102 and S103, such as lines that fall in the middle of business cards or documents, or lines in the middle of forms, and so on.

Step S106, for each of the boundary line regions, a target boundary line corresponding to the boundary line region is determined from the plurality of reference boundary lines.

Specifically, for each of the boundary line regions, determining the target boundary line corresponding to the boundary line region from the plurality of reference boundary lines may include: first, the slope of each of the reference boundary lines is calculated; then, for each of the boundary line regions, the boundary line region is converted into a plurality of straight lines, and the average slope of the plurality of straight lines is calculated, and then whether there is a reference boundary line having a slope matching the average slope in the plurality of reference boundary lines is determined. If there is, the reference boundary line is determined as the target boundary line corresponding to the boundary line region. In particular, the boundary line region may be converted into a plurality of straight lines using Hough transform, and of course, other methods may also be used for the conversion, which is not limited in the present embodiment.

In the present embodiment, the edge contour in the boundary line region is thicker. For each of the boundary line regions, the boundary line region is converted into a plurality of straight lines using Hough transform. These lines have similar slopes, and the average slope is found and compared with the slope of each of the reference boundary lines. Whether there is a reference boundary line having a slope matching the average slope in the plurality of reference boundary lines is determined, that is, the most similar reference boundary line is found from the plurality of reference boundary lines as the target boundary line corresponding to the boundary line region.

Since the difference between the slope of the determined target boundary line and the average slope may not be too large, a comparison threshold is set when the average slope is compared with the slope of each of the reference boundary lines. When the absolute value of the difference between the slope of a certain reference boundary line and the average slope is less than this comparison threshold, the slope of the reference boundary line is determined as the reference boundary line matching the average slope, and then it is further determined that the reference boundary line is the target boundary line corresponding to the boundary line region.

Furthermore, for each of the boundary line regions, if it is determined that there is no reference boundary line having a slope matching the average slope in the plurality of reference boundary lines, then the following is performed: for each of the straight lines converted from the boundary line region, the line matrix formed by the straight line is compared with the boundary matrix. The number of pixels on the straight line belonging to the boundary matrix is calculated as the score of the straight line. The straight line with the best score is determined as the target boundary line corresponding to the boundary line region. If there are a plurality of straight lines with the best score, then the first straight line thereof is used as the best boundary line according to the sorting algorithm. In particular, the line matrix is determined in the following manner: the straight lines are redrawn, the position information of the pixels in all the redrawn lines are mapped to the entire image matrix, and the value of the position of the pixels of the lines in the image matrix is set to the first value and the value of the position of the pixels other than the lines is set to the second value, thereby forming a line matrix. The forming method of the line matrix is similar to that of the boundary matrix, and is not repeated herein.

If the target boundary line corresponding to a certain boundary line region may not be found from the reference boundary line, then a corresponding line matrix is formed according to the matrix forming method described in steps S102 and S104 for the plurality of straight lines obtained by the Hough transform, and which line with pixels falling in the boundary matrix has the best score is determined, which is then considered to be the target boundary line corresponding to the boundary line region. For a method of calculating the score of the straight lines by comparing the line matrix formed by the straight lines with the boundary matrix, reference may be made to the relevant description in step S104, and details are not repeated herein.

For the image shown in FIG. 2A, the target boundary lines obtained via the above processing are the four longer lines shown in FIG. 2B. In the image shown in FIG. 3A, the target boundary lines obtained via the above processing are the four longer lines shown in FIG. 3B.

Step S107, an edge of the object in the image is determined according to the plurality of determined target boundary lines.

After a plurality of target boundary lines are determined, since each target boundary line corresponds to a boundary line region of the object in the image, the plurality of target boundary lines form an edge of the object in the image. As shown in the image shown in FIG. 2A, the edge of the object in the image is composed of four longer lines in FIG. 2B, namely target boundary lines a1, a2, a3, and a4. As shown in the image shown in FIG. 3A, the edge of the object in the image is composed of four longer lines in FIG. 3B, that is, target boundary lines b1, b2, b3, and b4.

Furthermore, a plurality of intersection points of the plurality of target boundary lines may further be obtained, and a projective transformation is performed on regions determined by the plurality of intersection points and the plurality of target boundary lines to obtain a front view of the object in the image. Each two adjacent target boundary lines are intersected to obtain an intersection point, and each intersection point and each target boundary line jointly define the region where the object is located in the image.

Figure 2C:
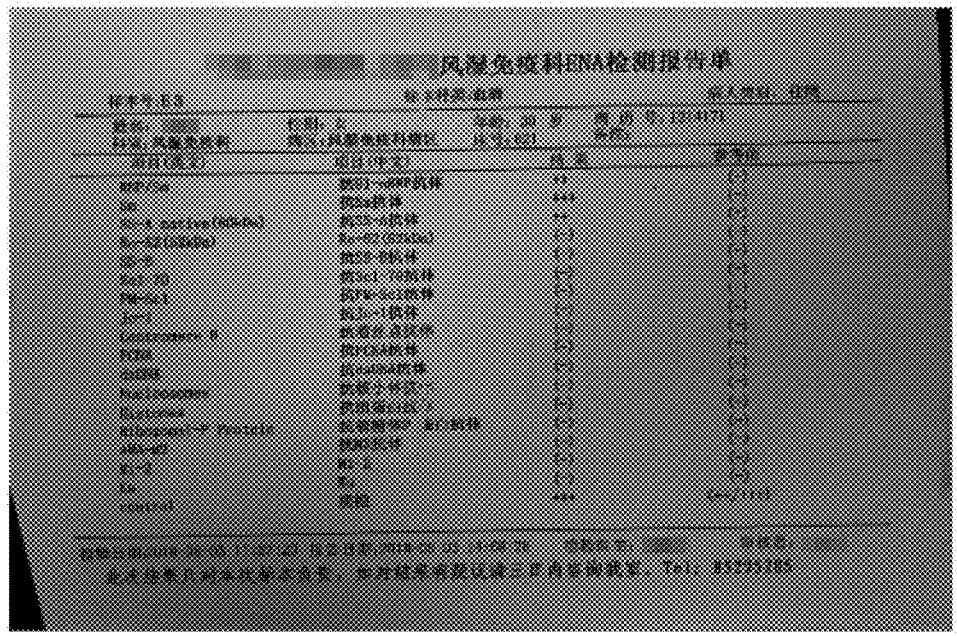
Figure 3C:
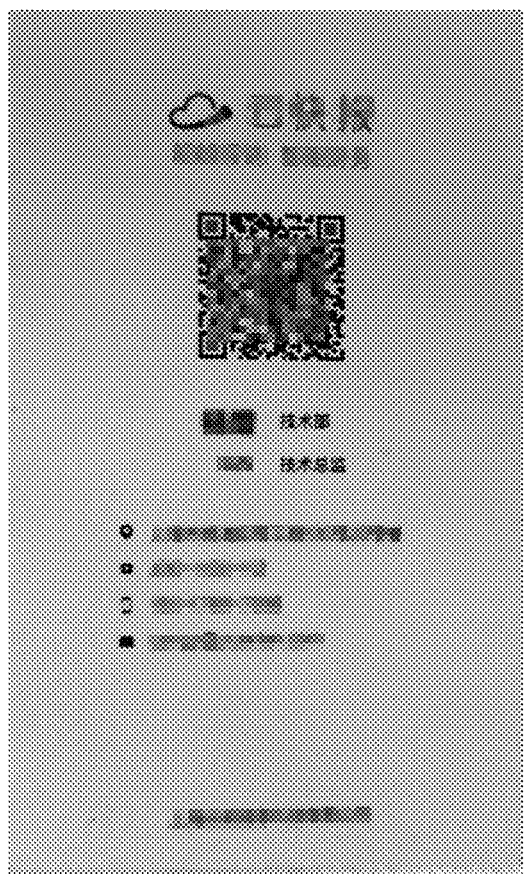

Projective transformation is to project the image to a new viewing plane, also known as projective mapping. The real shape of the object is changed in the image obtained by taking pictures, that is, geometric distortion occurs. As shown in the image shown in FIG. 2A, the shape of the test form is originally rectangular, but the shape of the test form in the image is changed and becomes a parallelogram. Therefore, by performing projective transformation on the region where the object in the image is located, the region where the object in the image is located may be transformed from a parallelogram to a square. That is, the region where the object in the image is located is normalized, thereby removing the influence of geometric distortion and obtaining a front view of the object in the image. In particular, the projective transformation is to process the pixels according to the space projection conversion coordinates to obtain the front view, which is not repeated herein. As shown in the image shown in FIG. 2A, the front view of the object test form in the final obtained image is shown in FIG. 2C. As shown in the image shown in FIG. 3A, the front view of the object business card in the final obtained image is shown in FIG. 3C.

Based on the above, in the present embodiment, first the line drawing of the grayscale contour in the image is obtained, and similar lines in the line drawing are merged to obtain a plurality of initial merged lines. A boundary matrix is determined according to the plurality of initial merged lines, and similar lines in the plurality of initial merged lines are further merged to obtain target lines. At the same time, the initial merged lines that may not be merged are also directly used as target lines, and then a plurality of reference boundary lines are determined from the plurality of target lines according to the boundary matrix. At the same time, the image is processed via a pre-trained boundary line region identification model to obtain a plurality of boundary line regions of the object in the image. Therefore, for each boundary line region, a target boundary line corresponding to the boundary line region may be determined from the plurality of reference boundary lines, and then an edge of the object in the image may be determined according to the plurality of determined target boundary lines. In the present embodiment, the reference boundary lines are obtained according to the image, and machine learning is incorporated to identify the boundary line region, so as to jointly determine the target boundary line of the object in the image to achieve edge detection of the object in the image, and the position of the edge of the object in the image may be quickly located, and the accuracy of edge detection is increased.

Figure 5:
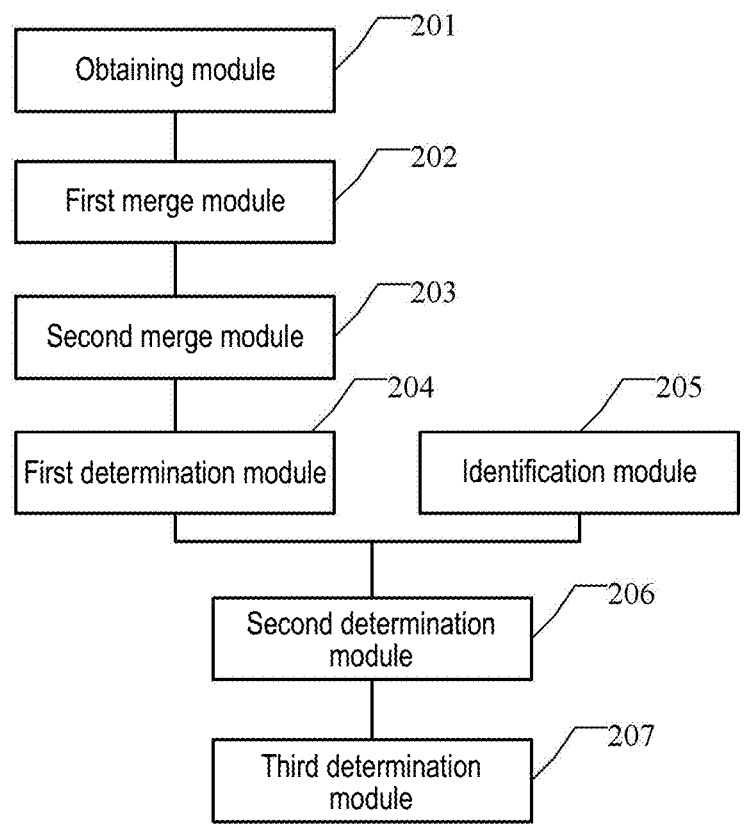
FIG. 5 is a structural diagram of an edge detection device of an object in an image provided by an embodiment of the invention.

Corresponding to the above method embodiment, an embodiment of the invention further provides an edge detection device of an object in an image. FIG. 5 is a structural diagram of an edge detection device of an object in an image provided by an embodiment of the invention. Please refer to FIG. 5, an edge detection device of an object in an image includes: an obtaining module 201 configured to process an image to obtain a line drawing of a grayscale contour in the image;
  a first merge module 202 configured to merge similar lines in the line drawing to obtain a plurality of initial merged lines, and a boundary matrix is determined according to the plurality of initial merged lines;
  a second merge module 203 configured to merge similar lines in the plurality of initial merged lines to obtain target lines, and also use unmerged initial merged lines as target lines;
  a first determination module 204 configured to determine a plurality of reference boundary lines from the plurality of target lines according to the boundary matrix;
  an identification module 205 configured to process the image via a pre-trained boundary line region identification model to obtain a plurality of boundary line regions of an object in the image, wherein the boundary line region identification model is a model based on a neural network;
  a second determination module 206 configured to determine, for each of the boundary line regions, a target boundary line corresponding to the boundary line region from the plurality of reference boundary lines;
  a third determination module 207 configured to determine an edge of the object in the image according to the plurality of determined target boundary lines.

Optionally, the obtaining module 201 is specifically configured to: process an image via an edge detection algorithm based on OpenCV to obtain a line drawing of a grayscale contour in the image.

Optionally, the first merge module 202 merging similar lines in the line drawing to obtain the plurality of initial merged lines is specifically: long lines in the line drawing are obtained, wherein the long lines are lines having a length exceeding a first preset threshold; a plurality of groups of first-type lines are obtained from the long lines, wherein the first-type lines include at least two long lines adjacent in sequence, and the angle between any two arbitrarily adjacent long lines is less than the second preset threshold; for each group of first-type lines, each of the long lines in the group of first-type lines is merged in sequence to obtain an initial merged line.

Optionally, the second merge module 203 merging similar lines in the plurality of initial merged lines to obtain target lines is specifically: a plurality of groups of second-type lines are obtained from the plurality of initial merged lines, wherein the second-type lines include at least two merged initial merged lines adjacent in sequence, and the angle between any two adjacent initial merged lines is less than a third preset threshold. For each group of second-type lines, each of the initial merged lines in the group of second-type lines is merged in sequence to obtain a target line.

Optionally, an angle θ of two lines is calculated by the following formula:

$$\vec{a} \cdot \vec{b} = |\vec{a}||\vec{b}| \cos \theta,$$

wherein $\vec{a}$ and $\vec{b}$ respectively represent vectors of two lines.

Optionally, the boundary matrix is determined in the following manner: the plurality of initial merged lines and unmerged lines in the long lines are redrawn, the position information of the pixels in all the redrawn lines is mapped to the entire image matrix, and the value of the position of the pixels of the lines in the image matrix is set to a first value and the value of the position of the pixels other than the lines is set to a second value, thereby forming a boundary matrix.

Optionally, the first determination module 204 includes:
a first calculation sub-module configured to, for each of the target lines, extend the target line, determine a line matrix according to the extended target line, then compare the line matrix with the boundary matrix, and calculate the number of pixels on the extended target line belonging to the boundary matrix as the score of the target line, wherein the line matrix is the same size as the boundary matrix;
a first determination sub-module configured to determine a plurality of reference boundary lines from the plurality of target lines according to the score of each of the target lines.

Optionally, the second determination module 206 includes:
a second calculation sub-module configured to calculate a slope of each of the reference boundary lines;
a second determination sub-module configured to convert the boundary line region into a plurality of straight lines for each of the boundary line regions and calculate the average slope of the plurality of straight lines, and then determine whether there is a reference boundary line having a slope matching the average slope in the plurality of reference boundary lines. If yes, then the reference boundary line is determined as the target boundary line corresponding to the boundary line region.

Optionally, the second determination sub-module is further configured to, for each of the boundary line regions, compare the line matrix formed by the straight line with the boundary matrix for each of the straight lines converted from the boundary line region if it is determined that there is no reference boundary line having a slope matching the average slope in the plurality of reference boundary lines. The number of pixels on the straight line belonging to the boundary matrix is calculated as the score of the straight line. The straight line with the best score is determined as the target boundary line corresponding to the boundary line region, wherein the line matrix and the boundary matrix have the same size.

Optionally, the second determination sub-module converting the boundary line region into the plurality of straight lines is specifically: the boundary line region is converted into the plurality of straight lines using Hough transform.

Optionally, the line matrix is determined in the following manner: the extended target lines or the long lines are redrawn, the position information of the pixels in all the redrawn lines is mapped to the entire image matrix, and the value of the position of the pixels of the lines in the image matrix is set to a first value and the value of the position of the pixels other than the lines is set to a second value, thereby forming a line matrix.

Optionally, the device further includes: a model training module configured to train in the following manner to obtain a boundary line region identification model:
each of the image samples in an image sample set is subjected to label processing to label a boundary line region, an inner region, and an outer region of the object in each of the image samples; and the neural network is trained via the image sample set subjected to label processing to obtain the boundary line region identification model.

Optionally, the device further includes: a transformation module configured to obtain a plurality of intersection points of the plurality of target boundary lines and perform projective transformation on a region determined by the plurality of intersection points and the plurality of target boundary lines to obtain the front view of the object in the image.

Based on the above, in the present embodiment, first the line drawing of the grayscale contour in the image is obtained, and similar lines in the line drawing are merged to obtain a plurality of initial merged lines. A boundary matrix is determined according to the plurality of initial merged lines, and similar lines in the plurality of initial merged lines are further merged to obtain target lines. At the same time, the initial merged lines that may not be merged are also directly used as target lines, and then a plurality of reference boundary lines are determined from the plurality of target lines according to the boundary matrix. At the same time, the image is processed via a pre-trained boundary line region identification model to obtain a plurality of boundary line regions of the object in the image. Therefore, for each boundary line region, a target boundary line corresponding to the boundary line region may be determined from the plurality of reference boundary lines, and then an edge of the object in the image may be determined according to the plurality of determined target boundary lines. In the present embodiment, the reference boundary lines are obtained according to the image, and machine learning is incorporated to identify the boundary line region, so as to jointly determine the target boundary line of the object in the image to achieve edge detection of the object in the image, and the position of the edge of the object in the image may be quickly located, and the accuracy of edge detection is increased.

Figure 6:
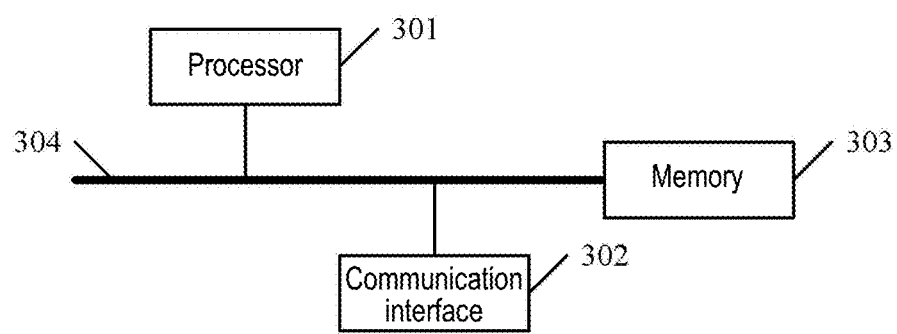
FIG. 6 is a structural diagram of an electronic equipment provided by an embodiment of the invention.

An embodiment of the invention also provides an electronic equipment. FIG. 6 is a structural diagram of an electronic equipment provided by an embodiment of the invention. Referring to FIG. 6, an electronic equipment includes a processor 301, a communication interface 302, a memory 303, and a communication bus 304, wherein the processor 301, the communication interface 302, and the memory 303 complete communication with each other via the communication bus 304, the memory 303 is configured to store a computer program, and when the processor 301 is configured to execute a program stored on the memory 303, the following steps are implemented:
an image is processed to obtain a line drawing of a grayscale contour in the image;
long lines in the line drawing are obtained, similar lines in the long lines are merged to obtain a plurality of initial merged lines, and a boundary matrix is determined according to the plurality of initial merged lines and unmerged lines in the long lines;

similar lines in the plurality of initial merged lines are merged to obtain a plurality of target lines;

a plurality of reference boundary lines are determined from the plurality of target lines according to the boundary matrix;

the image is processed via a pre-trained boundary line region identification model to obtain a plurality of boundary line regions of an object in the image, wherein the boundary line region identification model is obtained by training a neural network model via image samples labeled with the boundary line region;

for each of the boundary line regions, a target boundary line corresponding to the boundary line region is determined from the plurality of reference boundary lines;

an edge of the object in the image is determined according to the plurality of determined target boundary lines.

For specific implementation of each step of the method and related explanation content, reference may be made to the method embodiment shown in FIG. 1 above, and details are not repeated herein. In addition, other implementations of the edge detection method of the object in the image implemented by the processor 301 executing a program stored on the memory 303 are the same as the implementations mentioned in the foregoing method embodiment section, and are not repeated herein.

Based on the above, in the present embodiment, first the line drawing of the grayscale contour in the image is obtained, and similar lines in the line drawing are merged to obtain a plurality of initial merged lines. A boundary matrix is determined according to the plurality of initial merged lines, and similar lines in the plurality of initial merged lines are further merged to obtain target lines. At the same time, the initial merged lines that may not be merged are also directly used as target lines, and then a plurality of reference boundary lines are determined from the plurality of target lines according to the boundary matrix. At the same time, the image is processed via a pre-trained boundary line region identification model to obtain a plurality of boundary line regions of the object in the image. Therefore, for each boundary line region, a target boundary line corresponding to the boundary line region may be determined from the plurality of reference boundary lines, and then an edge of the object in the image may be determined according to the plurality of determined target boundary lines. In the present embodiment, the reference boundary lines are obtained according to the image, and machine learning is incorporated to identify the boundary line region, so as to jointly determine the target boundary line of the object in the image to achieve edge detection of the object in the image, and the position of the edge of the object in the image may be quickly located, and the accuracy of edge detection is increased.

The electronic equipment may be a computing equipment such as a desktop computer, a notebook, a palmtop computer, and a cloud server. The communication bus mentioned in the above electronic equipment may be a peripheral component interconnect (PCI) bus or an extended industry standard architecture (EISA) bus, etc. The communication bus may be divided into an address bus, a data bus, and a control bus, etc. For ease of representation, only a thick line is used in the figures, but it does not mean that there is only one bus or one type of bus.

The communication interface is configured for communication between the above electronic equipment and other equipment. The memory may include random-access memory (RAM), or non-volatile memory (NVM), such as at least one disk memory. Optionally, the memory may also be at least one storage device located away from the above processor.

The above processor may be a general-purpose processor, including a central processing unit (CPU), a network processor (NP), etc.; or a digital signal processor (DSP), an application-specific integration circuit (ASIC), a field-programmable gate array (FPGA), or other programmable logic devices, discrete gates, transistor logic devices, or discrete hardware components. The general-purpose processor may be a microprocessor or the processor may also be any conventional processor, etc. The processor is the control center of the electronic equipment, and uses various interfaces and circuits to connect various parts of the entire electronic equipment.

An embodiment of the invention provides a computer-readable storage medium. A computer program is stored in the computer-readable storage medium. When the computer program is executed by a processor, the following steps may be implemented:

an image is processed to obtain a line drawing of a grayscale contour in the image;

long lines in the line drawing are obtained and similar lines in the line drawing are merged to obtain a plurality of initial merged lines, and a boundary matrix is determined according to the plurality of initial merged lines;

similar lines in the plurality of initial merged lines are merged to obtain a plurality of target lines;

a plurality of reference boundary lines are determined from the plurality of target lines according to the boundary matrix;

the image is processed via a pre-trained boundary line region identification model to obtain a plurality of boundary line regions of an object in the image, wherein the boundary line region identification model is a model based on a neural network;

for each of the boundary line regions, a target boundary line corresponding to the boundary line region is determined from the plurality of reference boundary lines;

an edge of the object in the image is determined according to the plurality of determined target boundary lines.

It should be noted that other embodiments of the edge detection method of the object in the image implemented when the above computer program is executed by the processor are the same as the embodiments of the edge detection method of the object in the image mentioned in the above method section, and are not repeated herein.

Based on the above, in the present embodiment, first the line drawing of the grayscale contour in the image is obtained, and similar lines in the line drawing are merged to obtain a plurality of initial merged lines. A boundary matrix is determined according to the plurality of initial merged lines, and similar lines in the plurality of initial merged lines are further merged to obtain target lines. At the same time, the initial merged lines that may not be merged are also directly used as target lines, and then a plurality of reference boundary lines are determined from the plurality of target lines according to the boundary matrix. At the same time, the image is processed via a pre-trained boundary line region identification model to obtain a plurality of boundary line regions of the object in the image. Therefore, for each boundary line region, a target boundary line corresponding to the boundary line region may be determined from the plurality of reference boundary lines, and then an edge of the object in the image may be determined according to the plurality of determined target boundary lines. In the present embodiment, the reference boundary lines are obtained according to the image, and machine learning is incorporated to identify the boundary line region, so as to jointly determine the target boundary line of the object in the image to achieve edge detection of the object in the image, and the position of the edge of the object in the image may be quickly located, and the accuracy of edge detection is increased.

The readable storage medium may be a tangible equipment that may hold and store instructions used by an instruction execution equipment, such as but not limited to an electrical storage equipment, a magnetic storage equipment, an optical storage equipment, an electromagnetic storage equipment, a semiconductor storage equipment, or any suitable combination of the above. More specific examples of the readable storage medium (non-exhaustive list) include: portable computer disks, hard disks, random-access memories (RAM), read-only memories (ROM), erasable programmable read-only memories (EPROM or flash memories), static random-access memories (SRAM), portable compact disk read-only memories (CD-ROM), digital versatile disks (DVD), memory sticks, floppy disks, mechanical coding equipment, punched cards or raised structures in a groove on which instructions are stored, for example, and any suitable combination of the above. The computer program described herein may be downloaded from a readable storage medium to various computing/processing equipment, or to an external computer or external storage equipment via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing equipment receives the computer program from the network and forwards the computer program for storage in a readable storage medium in each computing/processing equipment. The computer program configured to execute the operations of the invention may be assembly instructions, instruction set architecture (ISA) instructions, machine instructions, machine-related instructions, microcodes, firmware instructions, state setting data, or source codes or object codes written in any combination of one or a plurality of programming languages. The programming languages include object-oriented programming languages such as Smalltalk, C++, etc., and conventional procedural programming languages such as "C" language or similar programming languages. The computer program may be executed entirely on a user's computer, partly on the user's computer, as an independent software package, partly on the user's computer and partly on a remote computer, or entirely on the remote computer or server. In situations involving remote computers, the remote computer may be connected to the user's computer via any kind of network, including a local area network (LAN) or a wide area network (WAN), or may be connected to an external computer (for example, using an Internet service provider to connect via the Internet). In some embodiments, by using the status information of the computer program to personalize an electronic circuit, such as a programmable logic circuit, a field-programmable gate array (FPGA), or a programmable logic array (PLA), the electronic circuit may execute computer-readable program instructions to achieve various aspects of the invention.

Various aspects of the invention are described herein with reference to flowcharts and/or block diagrams of methods, systems, and computer program products according to embodiments of the invention. It should be understood that each block of the flowcharts and/or block diagrams and a combination of blocks in the flowcharts and/or block diagrams may be implemented by computer programs. These computer programs may be provided to the processors of general-purpose computers, special-purpose computers, or other programmable data processing devices, thereby producing a machine such that when these programs are executed by the processors of computers or other programmable data processing devices, a device that implements the functions/acts specified in one or a plurality of blocks in the flowcharts and/or block diagrams is produced. These computer programs may also be stored in a readable storage medium. These computer programs make the computer, programmable data processing device, and/or other equipment work in a specific way. Thus, the readable storage medium storing the computer programs includes an article of manufacture that includes instructions to implement various aspects of the functions/acts specified in one or a plurality of blocks in the flowcharts and/or block diagrams. A computer program may also be loaded onto a computer, other programmable data processing devices, or other equipment, so that a series of operating steps are executed on the computer, other programmable data processing devices, or other equipment to produce a computer-implemented process. Thus, the computer program executed on the computer, other programmable data processing devices, or other equipment implements the functions/acts specified in one or a plurality of blocks in the flowcharts and/or block diagrams.

It should be noted that the embodiments in the present specification are all described in a related manner. The same and similar parts between the embodiments are self-explanatory. Each embodiment focuses on the differences from other embodiments. In particular, since the embodiments of the device, the electronic equipment, and the computer-readable storage medium are basically similar to the method embodiments, the description thereof is relatively simple. For the related parts, refer to the description of the method embodiments.

In the present specification, relational terms such as first and second are used only to distinguish one entity or operation from another entity or operation, and do not necessarily require or imply that there is any such actual relationship or order between these entities or operations. Moreover, the terms "include", "contain", or any other variant thereof are intended to cover non-exclusive inclusion. Thus, a process, method, article, or equipment that includes a series of elements includes not only those elements, but also other elements that are not explicitly listed, or includes elements inherent to such a process, method, article, or equipment. Without further restrictions, an element defined by the sentence "includes one . . . " does not exclude that there are other identical elements in the process, method, article, or equipment that includes the element. The terminology used herein is for the object of describing particular embodiments only, and is not intended to limit the invention. As used herein, the singular forms "a", "an", and "the" are intended to also include the plural forms unless clearly indicated otherwise in the context. As used herein, the term "and/or" includes any and all combinations of one or a plurality of the associated listed items. When an expression such as "at least one of" is placed after a list of elements, the entire list of elements is modified, not the individual elements in that list. As used herein, the terms "substantially", "about", and similar terms are used as approximate terms rather than degree terms, and are intended to represent inherent deviations in measured or calculated values. The deviation will be recognized by those of ordinary skill in the art. In addition, in describing embodiments of the invention, the use of "may" refers to "one or a plurality of embodiments of the invention." Likewise, the term "exemplary" is intended to indicate an example.

The above description is only a description of preferred embodiments of the invention, and does not limit the scope of the invention. Any change or modification made by those of ordinary skill in the art according to the above disclosure falls within the scope of the claims.

What is claimed is:

1. An edge detection method of an object in an image, the method comprising:
    processing the image to obtain a line drawing of a grayscale contour in the image;
    merging a plurality of similar lines in the line drawing to obtain a plurality of initial merged lines, and determining a boundary matrix according to the plurality of initial merged lines;
    obtaining a plurality of target lines according to the plurality of initial merged lines, comprises: merging a plurality of similar initial merged lines in the plurality of initial merged lines to obtain at least one of the target lines, and using one or a plurality of unmerged initial merged lines as one or a plurality of the target lines;
    determining a plurality of reference boundary lines from the plurality of target lines according to the boundary matrix;
    processing the image via a pre-trained boundary line region identification model to obtain a plurality of boundary line regions of the object in the image, wherein the boundary line region identification model is a model based on a neural network;
    determining a target boundary line corresponding to the boundary line region from the plurality of reference boundary lines for each of the boundary line regions;
    determining an edge of the object in the image according to the plurality of target boundary lines determined by the plurality of boundary line regions.

2. The edge detection method of the object in the image of claim 1, wherein processing the image to obtain the line drawing of the grayscale contour in the image comprises:
    processing the image by an edge detection algorithm based on OpenCV to obtain the line drawing of the grayscale contour in the image.

3. The edge detection method of the object in the image of claim 1, wherein merging the plurality of similar lines in the line drawing to obtain the plurality of initial merged lines comprises:
    obtaining a plurality of long lines in the line drawing, wherein the long lines are lines having a length exceeding a first preset threshold;
    obtaining a plurality of groups of first-type lines from the plurality of long lines, wherein each group of first-type lines comprises at least two long lines adjacent in sequence, and an angle between any two adjacent long lines is less than a second preset threshold;
    merging each of the long lines in the group of first-type lines in sequence to obtain one of the initial merged lines for each group of first-type lines.

4. The edge detection method of the object in the image of claim 3, wherein an angle θ of two lines is calculated by the following formula:

$$\vec{a} \cdot \vec{b} = |\vec{a}||\vec{b}| \cos \theta,$$

wherein $\vec{a}$ and $\vec{b}$ respectively represent a vector of two lines.

5. The edge detection method of the object in the image of claim 3, wherein the boundary matrix is determined in the following manner: redrawing the plurality of initial merged lines and un merged long lines in the long lines, mapping a position information of pixels in all the redrawn lines to an entire image matrix, and setting a value of a position of the pixels of the lines in the image matrix to a first value and setting a value of a position of the pixels other than the lines to a second value, thereby forming a boundary matrix.

6. The edge detection method of the object in the image of claim 1, wherein merging the similar initial merged lines in the plurality of initial merged lines to obtain the target lines comprises:
    obtaining a plurality of groups of second-type lines from the plurality of initial merged lines, wherein each group of second-type lines comprises at least two of the initial merged lines adjacent in sequence, and an angle between any two adjacent initial merged lines is less than a third preset threshold;
    merging each of the initial merged lines in the group of second-type lines in sequence to obtain a target line for each group of second-type lines.

7. The edge detection method of the object in the image of claim 1, wherein determining the plurality of reference boundary lines from the plurality of target lines according to the boundary matrix comprises:
    extending the target line for each of the target lines, determining a line matrix according to the extended target line, then comparing the line matrix with the boundary matrix, and calculating a number of pixels on the extended target line belonging to the boundary matrix as a score of the target line, wherein the line matrix is a same size as the boundary matrix;
    determining a plurality of reference boundary lines from the plurality of target lines according to the score of each of the target lines.

8. The edge detection method of the object in the image of claim 7, wherein the line matrix is determined in the following manner: redrawing the extended target line or straight lines, mapping a position information of pixels in all the redrawn lines to an entire image matrix, and setting a value of a position of the pixels of the lines in the image matrix to a first value and setting a value of a position of the pixels other than the lines to a second value, thereby forming a line matrix.

9. The edge detection method of the object in the image of claim 1, wherein for each of the boundary line regions, determining the target boundary line corresponding to the boundary line region from the plurality of reference boundary lines comprises:
    calculating a slope of each of the reference boundary lines;
    converting the boundary line region into a plurality of straight lines for each of the boundary line regions and calculating an average slope of the plurality of straight lines, and then determining whether there is a reference boundary line having a slope matching the average slope in the plurality of reference boundary lines, and if yes, then determining the reference boundary line as the target boundary line corresponding to the boundary line region.

10. The edge detection method of the object the image of claim 9, wherein the method further comprises:

comparing a line matrix formed by the straight lines with the boundary matrix for each of the straight lines converted from the boundary line region if it is determined that there is no reference boundary line having a slope matching the average slope in the plurality of reference boundary lines for each of the boundary line regions, calculating a number of pixels on the straight lines belonging to the boundary matrix as a score of the straight lines, and determining a straight line with a best score as the target boundary line corresponding to the boundary line region, wherein the line matrix and the boundary matrix have a same size.

11. The edge detection method of the object in the image of claim 9, wherein converting the boundary line region into the plurality of straight lines comprises:
converting the boundary line region into the plurality of straight lines by Hough transform.

12. The edge detection method of the object in the image of claim 1, wherein the boundary line region identification model is trained in the following manner:
subjecting each image sample in an image sample set to a label processing to label a boundary line region, an internal region, and an external region of an object in each image sample;
training a neural network via the image sample set subjected to the label processing to obtain a boundary line region identification model.

13. The edge detection method of the object in the image of claim 1, wherein the method further comprises:
obtaining a plurality of intersection points of the plurality of target boundary lines, and performing a projective transformation on regions determined by the plurality of intersection points and the plurality of target boundary lines to obtain a front view of the object in the image.

14. An electronic equipment, comprising a processor, a communication interface, a memory, and a communication bus, wherein the processor, the communication interface, and the memory complete a communication between each other via the communication bus;
the memory is configured to store a computer program;
the processor is configured to implement the method step of claim 1 when executing the program stored on the memory.

15. A non-transitory computer-readable storage medium, wherein a computer program is stored in the non-transitory computer-readable storage medium, and when the computer program is executed by a processor, the method step of claim 1 implemented.

16. An edge detection device of an object in an image, the device comprising:
an obtaining module configured to process the image to obtain a line drawing of a grayscale contour in the image;
a first merge module configured to merge a plurality of similar lines in the line drawing to obtain a plurality of initial merged lines, and a boundary matrix is determined according to the plurality of initial merged lines;
a second merge module configured to obtain a plurality of target lines according to the plurality of initial merged lines, comprising: merging a plurality of similar initial merged lines in the plurality of initial merged lines to obtain at least one of the target lines, and using one or a plurality of unmerged initial merged lines also as one or a plurality of the target lines;

a first determination module configured to determine a plurality of reference boundary lines from the plurality of target lines according to the boundary matrix;
an identification module configured to process the image via a pre-trained boundary line region identification model to obtain a plurality of boundary line regions of the object in the image, wherein the boundary line region identification model is a model based on a neural network;
a second determination module configured to determine, for each of the boundary line regions, a target boundary line corresponding to the boundary line region from the plurality of reference boundary lines;
a third determination module configured to determine an edge of the object in the image according to the plurality of target boundary lines determined by the plurality of boundary line regions.

17. The edge detection method of the object in the image of claim 16, wherein the first merge module merging the plurality of similar lines in the line drawing to obtain the plurality of initial merged lines comprises:
obtaining a plurality of long lines in the line drawing, wherein the long lines are lines having a length exceeding a first preset threshold;
obtaining a plurality of groups of first-type lines from the plurality of long lines, wherein each group of first-type lines comprises at least two long lines adjacent in sequence, and an angle between any two adjacent long lines is less than a preset threshold;
merging each of the long lines in the group of first-type lines in sequence to obtain one of the initial merged lines for each group of first-type lines.

18. The edge detection device of the object in the image of claim 16, wherein the first determination module comprises:
a first calculation sub-module configured to, for each of the target lines, extend the target line, determine a line matrix according to the extended target line, then compare the line matrix with the boundary matrix, and calculate a number of pixels on the extended target line belonging to the boundary matrix as a score of the target line, wherein the line matrix is a same size as the boundary matrix;
a first determination sub-module configured to determine a plurality of reference boundary lines from the plurality of target lines according to the score of each of the target lines.

19. The edge detection device of the object in the image of claim 16, wherein the second determination module comprises:
a second calculation sub-module configured to calculate a slope of each of the reference boundary lines;
a second determination sub-module configured to convert the boundary line regions into a plurality of straight lines for each of the boundary line regions and calculate an average slope of the plurality of straight lines, and then determine whether there is a reference boundary line having a slope matching the average slope in the plurality of reference boundary lines, and if yes, then the reference boundary line is determined as the target boundary line corresponding to the boundary line region.

20. The edge detection device of the object in the image of claim 19, wherein the second determination sub-module is further configured to:
compare a line matrix formed by the straight lines with the boundary matrix for each of the straight lines converted from the boundary line region if it is determined that there is no reference boundary line having a slope matching the average slope in the plurality of reference boundary lines for each of the boundary line regions, calculate a number of pixels on the straight line belonging to the boundary matrix as a score of the straight line, and determine a straight line with a best score as the target boundary line corresponding to the boundary line region, wherein the line matrix and the boundary matrix have a same size.

* * * * *